PARTS OF PHOSPHITE + PHENOLIC = 1.25 PARTS
EXAMPLE 3

PARTS OF PHOSPHITE + PHENOLIC = 1.25 PARTS
EXAMPLE 2

INVENTORS
DONALD E. MILLER
BY RALPH G. FLEMING

ATTORNEY

United States Patent Office 3,535,277
Patented Oct. 20, 1970

3,535,277
BLENDS OF PHOSPHITES AND PHENOLS AND POLYMERS STABILIZED THEREWITH
Donald E. Miller, Akron, Ohio, and Ralph G. Fleming, Shelby, N.C., assignors to The Goodyear Tire & Rubber Company, Akron, Ohio, a corporation of Ohio
Filed June 5, 1967, Ser. No. 643,591
Int. Cl. C08f 45/58
U.S. Cl. 260—45.95                         13 Claims

ABSTRACT OF THE DISCLOSURE

Age resister blends of aralkyl substituted aryl phosphites and certain phenols which provide stabilization properties for polymers stabilized therewith over a particular range of blend ratios of the phosphite/phenolic blends.

---

Figure 1:
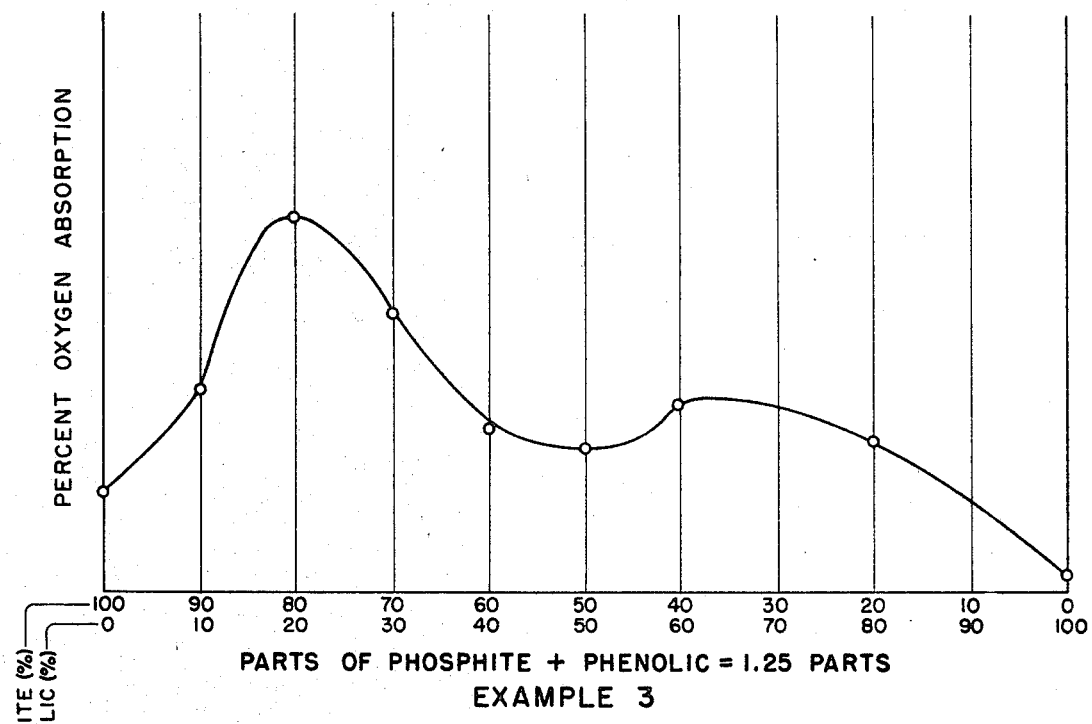

This invention relates to nondiscoloring antioxidant compositions and polymers containing such compositions.

The demand for nondiscoloring antioxidant systems has increased in recent years. Many compounds are known to be nondiscoloring antioxidants, for example, various phenolic and phosphite materials. However, many of these nondiscoloring antioxidants are rather inferior when compared to discoloring antioxidants, more commonly known as staining antioxidants, in the area of antioxidant activity. Therefore there has been much experimentation in an effort to obtain nondiscoloring antioxidant systems which possess greater antioxidant activity.

U.S. Pat. No. 3,080,338 reveals that certain phosphite type stabilizers may be used in combination with certain phenolic type antioxidants to protect synthetic rubbery polymers against breakdown and discoloration. It discloses that for optimum results the quantity of the phenolic antioxidant employed in combination with the aryl phosphite stabilizer must be carefully limited to about 0.0163 part to 0.19 part by weight per part of aryl phosphite stabilizer. Phosphite stabilizers in general do not afford protection against polymer degradation once the polymer is vulcanized. Therefore it is often necessary to add another stabilizer prior to vulcanization where phosphite stabilizers are used. Phenolic stabilizers normally provide protection both before and after vulcanization. Therefore it would be desirable to use phosphite/phenolic blends other than those disclosed in U.S. Pat. No. 3,080,338 which would possess optimum properties at higher levels of the phenolic component than the levels disclosed in U.S. Pat. No. 3,080,338.

It is an object of this invention to provide an effective nondiscoloring antioxidant system having superior antioxidant activity wherein rubbery polymers can be stabilized against discoloration and oxygen degradation before and after vulcanization. Other objects will appear as the description proceeds.

The foregoing object is accomplished by providing a stabilization composition comprising (a) at least one phosphite antioxidant conforming to the following structural formula:

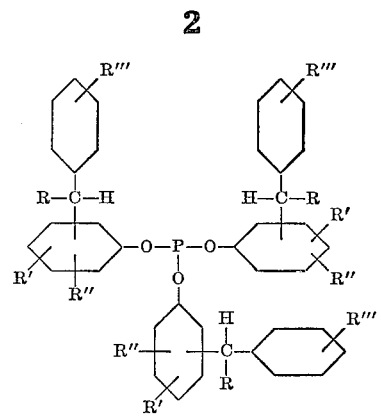

wherein R is a radical selected from the group consisting of hydrogen and methyl radicals and wherein R′, R″ and R‴ are radicals selected from the group consisting of hydrogen and lower alkyl radicals containing from 1 to 5 carbon atoms and wherein when R is a methyl radical, R′ and R″ are selected from the group consisting of hydrogen and lower alkyl radicals containing from 2 to 5 carbon atoms, and (b) at least one phenolic antioxidant selected from the group consisting of (1) aralkylene cresole conforming to the following structural formula:

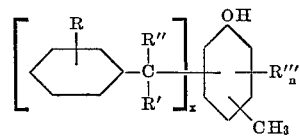

wherein R, R′ and R″ are selected from the group consisting of hydrogen and methyl radicals, R‴ is selected from the group consisting of teriary alkyl radicals of 4 to 12 carbon atoms, $x$ is a positive integer from 1 to 2, $n$ is a positive integer from 0 to 2, and the sum of $x+n$ is from 1 to 3; (2) tertiary alkylated phenols conforming to the following structural formula:

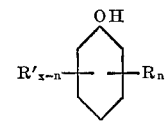

wherein $x$ is a positive integer from 2 to 3 and $n$ is a positive integer from 0 to 3 but not exceeding the value of $x$ and wherein R is selected from the group consisting of tertiary butyl and tertiary amyl radicals and R′ is selected from the group consisting of tertiary octyl and tertiary nonyl radicals, R and R′ being attached to the phenolic ring in the 2, 4 and 6 positions; (3) alkylated cresols conforming to the following structural formula:

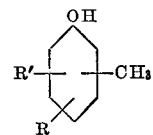

wherein R is a tertiary alkyl radical having 4 to 12 carbon atoms and R′ is a hydrogen or a tertiary alkyl radical having from 4 to 12 carbon atoms, there being at least one tertiary alkyl radical attached to the phenolic ring in a position ortho to the hydroxyl radical; and (4) phenolic-dicyclopentadiene reaction products formed by (1) reacting in the presence of a Friedel-Craft type catalyst, one mol of dicyclopentadiene and at least one mol of a phenolic material selected from the group consisting of phenol, para-cresol, mixed meta-para-cresol and para-ethyl phenol and (2) further reacting the first reaction product in the presence of an acidic alkylation catalyst with at least one-half mol of an olefin selected from the group consisting of isobutylene, tertiary amylenes and tertiary hexylenes.

Figure 2:
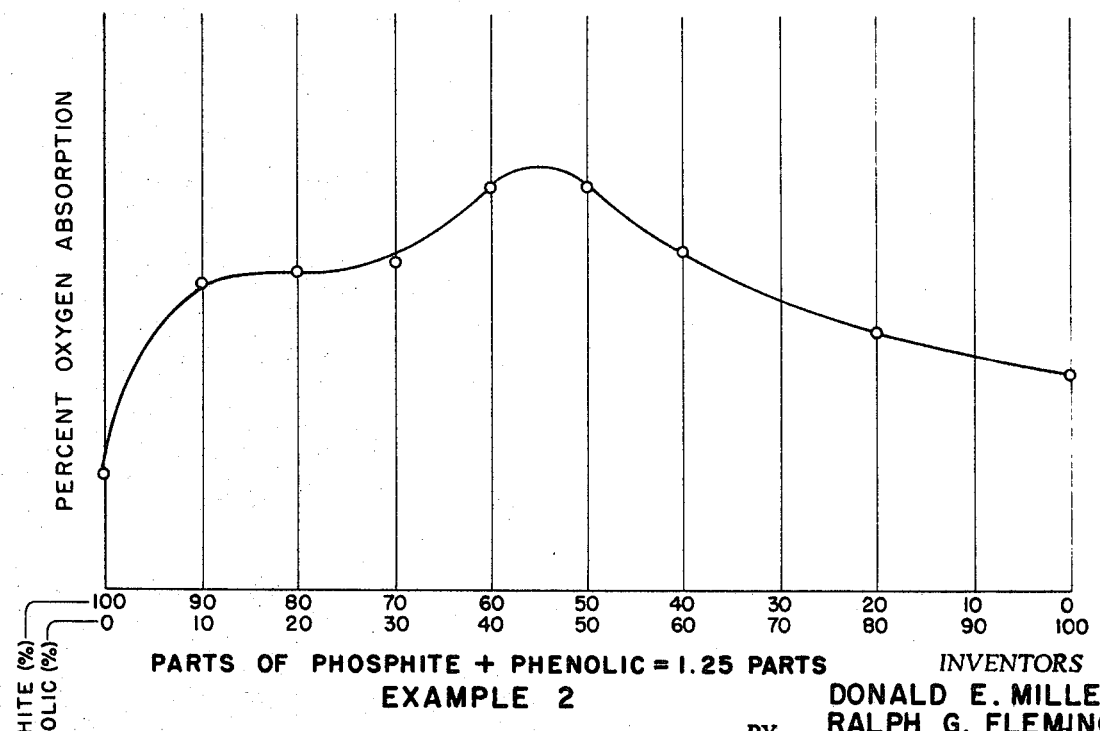
Figure 3:
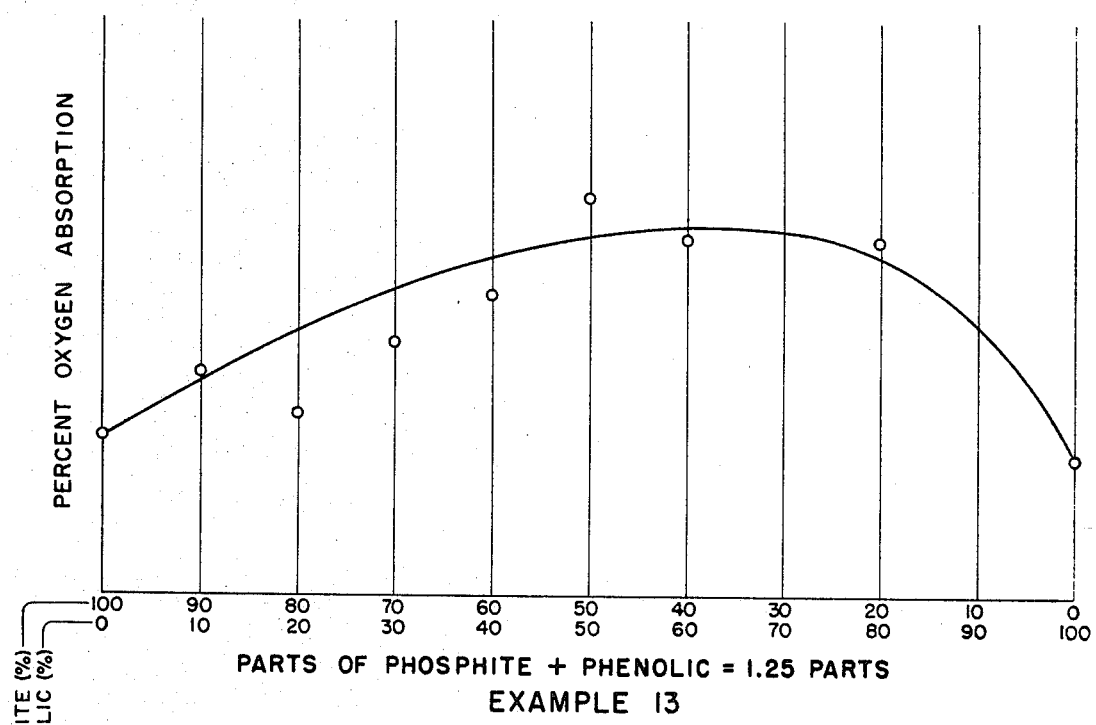
Figure 4:
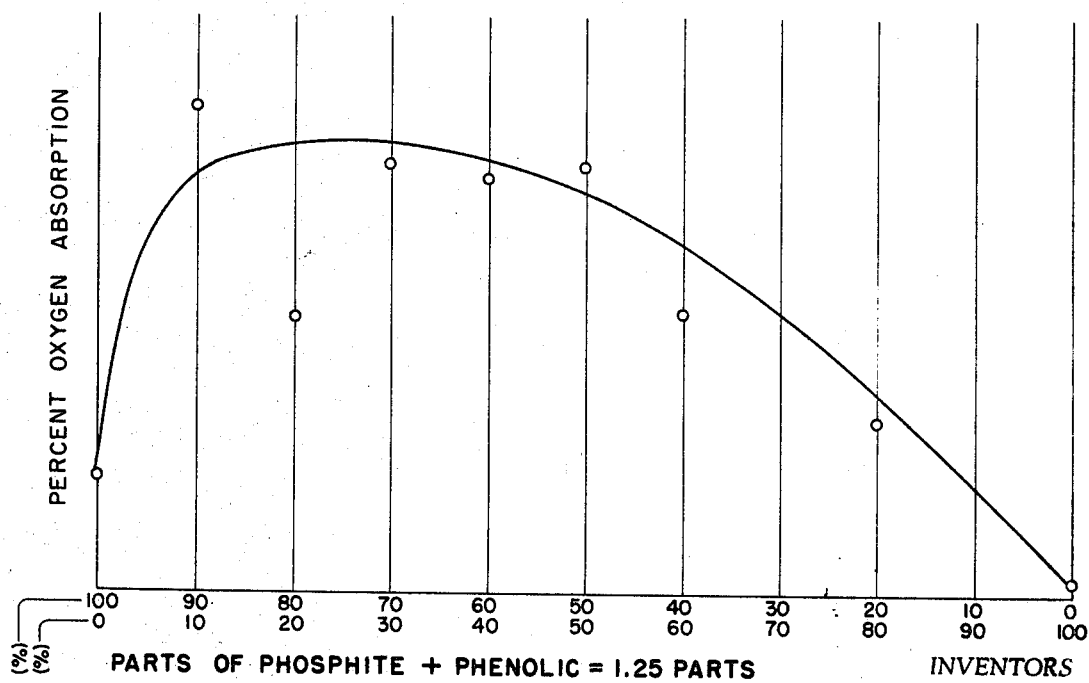

FIG. 1 is a blend curve for blends outside the scope of the present invention. FIGS. 2, 3 and 4 are blend curves for blends within the scope of the present invention. These curves indicate at what ratios of phosphite/phenolic blends optimum polymer protection is obtained. These curves are representative of the curves from which the data in Table I was obtained.

Representative examples of the phosphites are:

tri(2-α-methylbenzylphenyl)phosphite
tri(4-α-methylbenzylphenyl)phosphite
tri(2-methyl-4-benzylphenyl)phosphite
tri(3-methyl-6-benzylphenyl)phosphite
tri(2,4-dimethyl-6-benzylphenyl)phosphite
tri(2,5-dimethyl-4-benzylphenyl)phosphite
tri(2-benzyl-4-ethylphenyl)phosphite
tri(2-benzyl-4-butylphenyl)phosphite
tri(2,4-dibutyl-6-α-methylbenzylphenyl)phosphite
tri(2-α-methylbenzyl-4-amylphenyl)phosphite The triaryl phosphite stabilizers of the present invention may be made by any method known to the art. However, a preferred process for preparing the symmetrical triaryl phosphites consists of reacting at least three mols of a phenol having a benzyl or α-methylbenzyl substituent and optionally one or more lower alkyl substituents with one mol of a phosphorus trihalide, preferably phosphorus trichloride. The reaction is carried out under suitable reaction conditions which normally include conducting the reaction in an inert atmosphere such as nitrogen. After all of the reactants have been introduced, the reaction is conducted at a reaction temperature that does not substantially exceed 200° C. (preferably between 190° and 200° C.) until the evolution of hydrogen halide is complete.

A preferred phosphite component is the reaction product of a styrenated phenol and phosphorus trichloride. Another preferred phosphite component is a mixture of tri-(2-α-methylbenzylphenyl)phosphite and tri(4-α-methylbenzylphenyl)phosphite.

Any of the phenols and cresols may be made by any of the many methods known to the art. Some of the aralkylene phenols may be prepared by styrenating and butylating a cresol.

Representative examples of aralkylene cresols are:

2,4-di-α-phenylethyl, 6-tertiary-butyl m-cresol
2,6-di-α-phenylethyl p-cresol
4-tertiary butyl, 6-α-phenylethyl m-cresol
4-α-phenylethyl, 6-tertiary-butyl p-cresol
2-α-phenylethyl, 6-tertiary-butyl m-cresol
4-α-phenylethyl m-cresol
2-α-phenylethyl p-cresol Some of the tertiary alkylated phenols may be prepared by butylating and octylating phenol.

Representative examples of the tertiary alkylated phenols are:

2,4-dioctyl, 6-tertiary-butyl phenol
2,6 dinonyl phenol
2,4,6-trioctyl phenol
2-tertiary-amyl, 4-nonyl phenol
2,6-ditertiary-butyl phenol
2,6-ditertiary-amyl, 4-nonyl phenol
2,4,6-tritertiary-butyl phenol Some of the alkylated cresols may be made by butylating, amylating or hexylating a cresol. Representative examples of the alkylated cresols are:

2-tertiary-butyl p-cresol
2-tertiary-hexyl m-cresol
2-tertiary-butyl, 4-tertiary-hexyl o-cresol
2-tertiary-butyl, 6-tertiary-hexyl p-cresol
2,6-ditertiary-butyl p-cresol
2,6-ditertiary-hexyl p-cresol Representative examples of the phenolic-dicyclopentadiene reaction products are:

isobutylated reaction product of p-cresol and dicyclopentadiene
isobutylated reaction product of phenol and dicyclopentadiene
isobutylated reaction product of p-ethyl phenol and dicyclopentadiene
tertiary amylated reaction product of phenol and dicyclopentadiene
tertiary amylated reaction product of mixed m,p-cresol and dicyclopentadiene
tertiary hexylated reaction product of mixed m,p-cresol and dicyclopentadiene
tertiary hexylated reaction product of p-ethyl phenol and dicyclopentadiene A preferred phenolic component is a butylated and styrenated cresol. Another preferred phenolic component is a mixture of at least one aralkylene cresol and at least one alkylated cresol. Still another preferred phenolic component is a mixture of an aralkylene cresol wherein R and R' are hydrogen, R" is methyl and R''' is a tertiary butyl radical, and an alkylated cresol wherein R is a tertiary butyl radical and R' is a hydrogen or tertiary butyl radical.

The stabilizing compositions of this invention are useful in protecting polymers against degradation whether the polymer is vulcanized or unvulcanized. The stabilization components may be added to the polymer while the polymer is in latex or emulsion form, suspension form, dispersion form or solution form. They may also be added to dry polymer using any of the conventional dry mixing means such as an open mill, an extruder or an internal mixer such as a Banbury mixer. The form in which the stabilization components are added to the polymer latices, suspensions, etc. will depend on such factors as the solubility of the components and whether they are liquids or solids. They may be added directly or in the form of emulsions, suspensions or solutions. The components of the stabilization composition may be added to the dry rubber or latex separately, together or in any combination and in any order. The optimum improvement in the stabilization activity normally occurs in the from 80/20 to 20/80 phosphite/phenolic range. A preferred range is from 70/30 to 40/60 phosphite/phenolic. A most preferred ratio is about 60/40 phosphite/phenolic. The amounts of the phosphite/phenolic compositions that may be used are from about 0.01 to about 5.0 parts, and preferably from about 0.25 to about 2.00 parts by weight per 100 parts of polymer. The amount of stabilizer necessary for a given degree of stabilization will vary depending on the type of polymer being stabilized. A relatively saturated polymer such as polyethylene or polypropylene will require less stabilizer than an unsaturated polymer such as those made from conjugated diene, e.g., butadiene-styrene copolymers.

By the term "polymer" as employed in this application is meant natural rubber and the synthetic polymers and copolymers prepared from conjugated dienes as well as the synthetic polymers and copolymers prepared from mono olefins. Representative examples of the synthetic polymers used in the practice of this invention are polychloroprene; homopolymers of a conjugated 1,3-diene such as isoprene and butadiene and in particular, polyisoprenes and polybutadienes having essentially all of their segmeric units combined in a cis-1,4 structure; copolymers of a conjugated 1,3-diene such as isoprene and butadiene with up to 50 percent by weight of at least one copolymerizable ethylenically unsaturated monomer such as styrene, acrylonitrile, unsaturated carboxylic acids, including acrylic, methacrylic, fumaric and itaconic acid; butyl rubber, which is a polymerization product of a major proportion of a mono olefin and a minor proportion of a multi olefin such as butadiene or isoprene; and polymers and copolymers of mono olefins containing little or no unsaturation, such as polyethylene, polypropylene, ethylene propylene copolymers and terpolymers of ethylene, propylene and a nonconjugated diene.

The practice of this invention is found particularly beneficial when applied to the stabilization of homopolymers of a conjugated 1,3-diene such as isoprene and butadiene and copolymers of said diene with up to 50 percent by weight of at least one copolymerizable ethylenically unsaturated monomer such as styrene, acrylonitrile, unsaturated carboxylic acids, including acrylic, methacrylic, fumaric and itaconic acid. The practice of this invention is found most beneficial when applied to the stabilization of copolymers of butadiene and styrene.

The antioxidant properties of the stabilizer systems of this invention were measured by oxygen absorption tests. The oxygen absorption tests were conducted by dissolving in benzene portions of the polymer to be stabilized, the solution containing various amounts of various antioxidant compositions of this invention. Polymers containing antioxidant compositions outside the practice of this invention were stabilized in the same manner. The cements so formed were poured onto aluminum foil so as to form a thin film. After drying the weight of rubber was obtained in connection with each sample. Thereafter the foil with the adhering rubber strip was placed in the oxygen absorption apparatus. The amount of oxygen absorbed in a particular interval of time was determined and recorded in the following table. This testing procedure is described in further detail in Industrial and Engineering Chemistry, 43, page 456 (1951) and Industrial and Engineering Chemistry, 45, page 392 (1953).

The practice of this invention will be more fully understood by referring to some of the following examples which are illustrative rather than restrictive of the scope of the invention.

EXAMPLES 1 THROUGH 16

A rubbery butadiene-styrene copolymer (Examples 1–16) was stabilized and tested in an oxygen absorption unit as described herein. Examples 1, 2, 5, 8 and 10 through 16 were stabilized with compositions of the present invention. Examples 3, 4, 6, 7 and 9 were stabilized with phosphite/phenolic compositions outside the scope of the present invention. Each of the examples represents several evaluations. In each example the polymer was stabilized with various ratios of phosphite to phenol antioxidant. In each case the total level of phosphite plus the phenol was 1.25 parts per 100 parts by weight of polymer. The ratios varied from (0/100) phosphite/phenolic antioxidant to (100/0) phosphite/phenolic antioxidant. A curve was plotted for each example, the time to a given percent oxygen absorption being plotted against the ratio of phosphite to phenolic antioxidant. The attached FIGS. 1, 2, 3 and 4 illustrate such curves, showing curves for Examples 3, 2, 13 and 16.

OXYGEN ABSORPTION TEST [1]

| Example | Phosphite stabilizer | Phenolic stabilizer | Oxygen Absorp. Temp., °C. | Percent oxygen Absorp. | Hours [3] | | Value at optimum ratio [5] | Optimum ratio,[6] weight phosphite/weight phenol | |
|---|---|---|---|---|---|---|---|---|---|
| | | | | | Phosphite [4] stabilizer | Phenolic [4] stabilizer | | Range | Point |
| 1 | R.P.[2] of styrenated phenol and phosphorus trichloride. | Butylated, styrenated mixed m,p-cresol. | 80 | 1.0 | 95 | 240 | 430 | 70/30–50/50 | 60/40 |
| 2 | R.P. of styrenated phenol and phosphorus trichloride. | ...do... | 90 | 0.3 | 80 | 190 | 400 | 70/30–40/60 | 55/45 |
| 3 | Trinonyl phenyl phosphite. | ...do... | 80 | 0.3 | 185 | 210 | 570 | 85/15–70/30 | 80/20 |
| 4 | R.P. of styrenated mixed m,p-cresol and phosphorus trichloride. | ...do... | 80 | 1.0 | 275 | 75 | 275 | 65/35–50/50 | 60/40 |
| 5 | R.P. of benzylated xylenols and phosphorus trichloride. | ...do... | 90 | 1.0 | 275 | 240 | 420 | 70/30–30/70 | 60/40–40/60 |
| 6 | R.P. of styrenated o-cresol and phosphorus trichloride. | ...do... | 90 | 1.0 | 24 | 75 | 75 | 0/100 | 0/100 |
| 7 | R.P. of styrenated xylenols and phosphorus trichloride. | ...do... | 90 | 1.0 | 45 | 97 | 97 | 0/100 | 0/100 |
| 8 | R.P. of styrenated phenol and phosphorus trichloride. | Butylated octylated phenol. | 90 | 0.5 | 100 | 20 | 400 | 70/30–40/60 | 55/45 |
| 9 | ...do... | Styrenated phenol. | 90 | 0.5 | 840 | 150 | 1,380 | 95/5–70/30 | 85/15 |
| 10 | ...do... | Butylated R.P. of p-cresol and dicyclopentadiene. | 90 | 0.5 | 205 | 50 | 475 | 95/5–30/70 | 70/30 |
| 11 | ...do... | 2,6-ditertiary butyl-4-methyl phenol. | 90 | 1.0 | 11 | 34 | 70–92 | 50/50–20/80 | 37/63 |
| 12 | R.P. of benzylated phenol and phosphorus trichloride. | Butylated, styrenated mixed m,p-cresol. | 90 | 1.0 | ([7]) | 80 | 200 | 65/35–35/65 | 55/45 |
| 13 | R.P. of styrenated phenol and phosphorus trichloride. | 2,6-ditertiary hexyl-4-methyl phenol. | 90 | 1.0 | 400 | 300 | 840 | 60/40–20/80 | 40/60 |
| 14 | R.P. of styrenated p-tertiary butyl phenol and phosphorus trichloride. | Butylated, styrenated mixed m,p-cresol. | 90 | 1.0 | 190 | 135 | 290 | 85/15–20/80 | 80/20–60/40 |
| 15 | R.P. of styrenated p-ethyl phenol and phosphorus trichloride. | ...do... | 90 | 1.0 | 170 | 90 | 465 | 90/10–50/50 | 70/30 |
| 16 | R.P. of phosphorus trichloride and the R.P. of phenol and toluene. | ...do... | 90 | 1.0 | 220 | 115 | ([8]) | 95/5–50/50 | 75/25 |

[1] The SBR polymer stablized was an SBR 1006 polymer containing about 23% bound styrene.
[2] R.P.—Reaction product.
[3] Hours to reach the percent oxygen absorbed.
[4] Oxygen absorption data for the phosphite and phenolic antioxidant describes the oxygen absorption values obtained where phosphite alone and the phenolic antioxidant alone are used at a level of 1.25 parts per 100 parts by weight of polymer.
[5] Value at optimum ratio is the highest oxygen absorption value attained using various ratios of the individual components.
[6] Optimum ratio describes the weight ratios of phosphite to phenolic antioxidant at which optimum protection, as shown by oxygen absorption tests, was obtained. The optimum point is particular ratio at which the optimum protection is obtained. The optimum range describes the range of ratios over which essentially optimum protection is afforded the polymer.
[7] 150 or less.
[8] 600 or 570.

Examples 3 and 9 illustrate that the ratio of certain phosphite/phenolic antioxidant blends must be carefully limited to low levels of phenolic antioxidants to obtain optimum results. The remaining examples, however, demonstrate that the blends of the present invention reach an optimum protection value at higher levels of phenol than described in U.S. Pat. 3,080,338 and/or have an expanded optimum level range which allows the use of large amounts of phenolic antioxidant, while at the same time obtaining essentialy optimum results. As disclosed earlier in this application it is highly desirable that optimum prevulcanization stabilization be attainable at higher levels of phenolic antioxidant since the post vulcanization protection depends on the amount of phenolic antioxidant present, phosphite antioxidants generally affording little or no post vulcanization protection.

A direct comparison between the examples of the hours to a given percent oxygen absorption is not possible since the examples were not necessarily tested at the same time and since the oxygen absorption was not necessarily the same for each example.

FIG. 1 shows the curve for Example 3, blends outside the scope of the present invention. FIGS. 2, 3 and 4 show the curves for Examples 2, 13 and 16, blends within the scope of the present invention. A comparison of FIG. 1 with FIGS. 2 and 3 reveals that essentially optimum protection is obtained over a much broader range of ratios for the blends (FIGS. 2 and 3) of the present invention than for a blend (FIG. 1) outside the scope of the present invention. A comparison of FIGS. 1 and 4 demonstrates that although an optimum level of protection is reached at relatively low levels of phenols, the optimum level of protection is essentially the same over a much broader range of ratios than that afforded by a blend outside the scope of the present invention (FIG. 1), thus allowing the use of a ratio containing a large amount of phenolic antioxidant without sacrificing postvulcanization protection.

EXAMPLES 17 THROUGH 19

Emulsified antioxidants (2.0 parts per 100 parts by weight of polymer) were added to an SBR 1006 latex prior to salt-acid coagulation of the latex. The antioxidant systems tested were the reaction product of a styrenated phenol and phosphorus trichloride (Example 17); a butylated styrenated mixed m,p-cresol (Example 19) and a 50/50 ratio of the phosphite and the phenol (Example 18). The SBR 1006 was mill compounded according to the following formulation.

| Components: | Parts |
| --- | --- |
| SBR 1006 | 100.0 |
| Zinc oxide | 10.0 |
| Titanium dioxide | 10.0 |
| 40% dicumyl peroxide on an inert filler | 2.20 |
| | 122.25 |

Sheets of the compounded stock, 4 x 6 x 0.07 inches, were vulcanized for 30 minutes at 310° F. Strips, 2 x 6 inches, were cut from the vulcanized sheets and some of them aged under ultraviolet light. Gardner color tests were run on both the aged and unaged samples. The aged samples were also visually evaluated for crazing and cracking after bending the strips over double. Surface cracks were considered as constituting crazing. Cracking was considered a cracking through essentially the entire sample.

| Components | Examples | | |
| --- | --- | --- | --- |
| | 17 | 18 | 19 |
| R.P. of styrenated phenol and phosphorus trichloride (parts) | 2.00 | 1.00 | |
| Butylated, styrenated mixed m,p-cresol (parts) | | 1.00 | 2.00 |
| UNAGED | | | |
| Gardner color test: | | | |
| $R_d$ | 92.6 | 93.0 | 89.9 |
| $a$ | −0.7 | −0.7 | −0.8 |
| $b$ | 3.6 | 3.5 | 3.5 |
| Color index | 21.6 | 22.2 | 20.4 |
| ULTRAVIOLET AGED | | | |
| Gardner color test: | | | |
| $R_d$ | 84.5 | 79.3 | 85.3 |
| $a$ | −1.8 | −1.4 | −1.5 |
| $b$ | 12.2 | 11.0 | 10.7 |
| Color index | 6.0 | 6.4 | 7.0 |
| Flat bend test | (1) | (2) | (3) |

1 Cracks at 24 hours.
2 Crazed at 48 hours. No cracking after 96 hours.
3 Crazed at 48 hours. No cracking after 96 hours.

As the data indicate, the aged color decreased as the level of phenolic antioxidant increased. In addition, the post vulcanization protection against polymer degradation as evidenced by the crazing and cracking data was increased where the amount of phenolic antioxidant was increased.

The above Gardner color tests made on a Gardner colored difference meter (ASTM D–1260 and ASTM–E–97) to provide $R_d$, $a$ and $b$ values. The $R_d$ value is high for white materials and low for black materials. Positive values of /a/ indicate redness while negative values of /a/ indicate greenness. Positive values of /b/ indicate yellowness and negative values of /b/ indicate blueness. The absolute values of /a/ and /b/ increased as the degree of discoloration increases. The values obtained from the Gardner test were used to form a color index. Color index=

$$\frac{\sqrt{R_d}}{|a|+|b|}$$

The color index value decreases as discoloration increases.

The previous Examples 1, 2 and 4 through 18, the phosphite stabilizers in general were made by reacting a 3/1 molar ratio mixture of the phenolic derivative and phosphorous trichloride. The phenolic derivatives were made by reacting an excess of the phenol compound, e.g., phenol in Example 1, with styrene, monochlorobenzene or vinyl toluene in the presence of a sulfuric acid catalyst. The reaction mixture molar ratios were normally 4/1 of phenol to the styrene, monochlorobenzene or vinyl toluene. The excess phenol compound was distilled out of the reaction product before reacting with the phosphorous trichloride. In Example 13, a compound identified as tris benzyl phosphite was used in the reaction with the phosphorous trichloride. The butylated, styrenated mixed m, p-cresol in Examples 1 through 7, 12, 14, 15, 16, 18 and 19 was made using 1/1/1 molar ratio charge of mixed m,p-cresol, styrene and isobutylene and toluene sulfonic acid catalyst. The butylated octylated phenol in Example 8 was made by reacting a mixture of phenol, diisobutylene and isobutylene in approximately a 1/2/1 molar charge ratio using a sulfuric acid/clay catalyst. The styrenated phenol in Example 9 was made by reacting a mixture containing a 1/2 molar ratio of phenol and styrene using a sulfuric acid catalyst. The butylated reaction product of p-cresol and dicyclopentadiene was made by reacting a 3/1 molar ratio mixture of p-cresol and dicyclopentadiene using a boron trifluoride catalyst, removing the excess p-cresol, dissolving the product in toluene and reacting with isobutylene in the presence of toluene sulfonic acid to form a product possessing 10 to 25 percent by weight of isobutyl substituents.

While certain representative embodiments and details have been shown for the purpose of illustrating the invention it will be apparent to those skilled in this art that various changes and modifications may be made without departing from the spirit or scope of the invention.

What we claim is:

1. A composition comprising (a) at least one phosphite antioxidant conforming to the following structural formula:

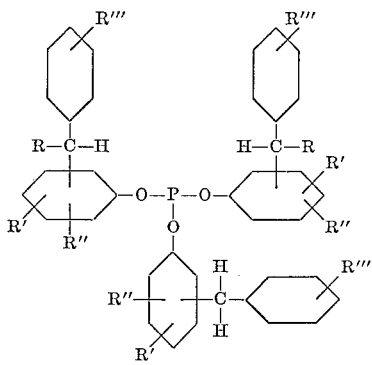

wherein R is a radical selected from the group consisting of hydrogen and methyl radicals, and wherein R', R" and R''' are radicals selected from the group consisting of hydrogen and lower alkyl radicals containing from 1 to 5 carbon atoms and wherein when R is a methyl radical, R' and R" are selected from the group consisting of hydrogen and lower alkyl radicals containing from 2 to 5 carbon atoms, and (b) at least one phenolic antioxidant selected from the group consisting of (1) arakylene cresols conforming to the following structural formula:

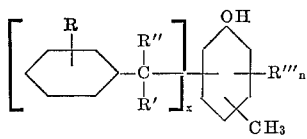

wherein R, R' and R" are selected from the group consisting of hydrogen and methyl radicals, R''' is selected from the group consisting of tertiary alkyl radicals of 4 to 12 carbon atoms, $x$ is a positive integer from 1 to 2, $n$ is a positive integer from 0 to 2, and the sum of $x+n$ is from 1 to 3; (2) tertiary alkylated phenols conforming to the following structural formula:

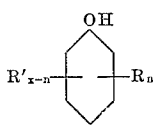

wherein $x$ is a positive integer from 2 to 3 and $n$ is a positive integer from 0 to 3 but not exceeding the value $x$ and wherein R is selected from the group consisting of tertiary butyl and tertiary amyl radicals and R' is selected from the group consisting of tertiary octyl and tertiary nonyl radicals, R and R' being attached to the phenolic ring in the 2, 4 and 6 positions; (3) alkylated cresols conforming to the following structural formula:

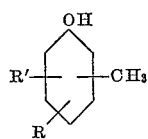

wherein R is a tertiary alkyl radical having 4 to 12 carbon atoms and R' is a hydrogen or a tertiary alkyl radical having from 4 to 12 carbon atoms, there being at least one tertiary alkyl radical attached to the phenolic ring in a position ortho to the hydroxyl radical; and (4) phenolic-dicyclopentadiene reaction products formed by (1) reacting in the presence of a Friedel-Craft type catalyst, one mol of dicyclopentadiene and at least one mole of a phenolic material selected from the group consisting of phenol, para-cresol, mixed meta-para-cresol and para-ethyl phenol and (2) further reacting the first reaction product in the presence of an acidic alkylation catalyst with at least one-half mol of an olefin selected from the group consisting of isobutylene, tertiary amylenes and tertiary hexylenes wherein the weight ratio of the phosphite antioxidant to the phenolic antioxidant is from 80/20 to 20/80.

2. A polymer selected from the group consisting of natural rubber, polychloroprene, homopolymers of a conjugated 1,3-diene, copolymers of a conjugated 1,3-diene with up to 50 percent by weight of at least one copolymerizable ethylenically unsaturated monomer, butyl rubber, polyethylene, polypropylene, ethylene propylene copolymers and terpolymers of ethylene, propylene and a nonconjugated diene, said polymer containing an antioxidant amount of the composition of claim 1.

3. The polymer of claim 2 wherein the polymer is selected from the group consisting of homopolymers of a conjugated 1,3 diene and copolymers of conjugated 1,3 dienes with up to 50 percent by weight of at least one copolymerizable ethylenically unsaturated monomer.

4. The polymer of claim 2 wherein the phenolic antioxidant comprises a mixture of at least one aralkylene cresol and at least one alkylated cresol.

5. The polymer of claim 2 wherein the phenolic antioxidant is a butylated and styrenated cresol.

6. The polymer of claim 2 wherein the phenolic antioxidant comprises a mixture of an aralkylene cresol wherein R and R' are hydrogen, R" is methyl and R''' is a tertiary butyl radical, and an alkylated cresol wherein R is a tertiary butyl radical and R' is selected from the group consisting of hydrogen and a tertiary butyl radical.

7. The polymer of claim 2 wherein the phosphite antioxidant comprises a mixture of tri(2-α-methylbenzylphenyl)phosphite and tri(4-α-methylbenzylphenyl)phosphite.

8. The polymer of claim 2 wherein the polymer is comprised of at least one copolymer of butadiene and styrene with up to 50 percent by weight of styrenes, the phenolic antioxidant comprises a mixture of at least one aralkylene cresol and at least one alkylated cresol and the phosphite antioxidant comprises a mixture of tri-(2-α-methylbenzylphenyl)phosphite and tri(4-α-methylbenzylphenyl) phosphite.

9. The composition of claim 1 wherein the phenolic antioxidant is the aralkylene cresol according to claim 1.

10. The composition of claim 1 wherein the phenolic antioxidant is the alkylated cresol according to claim 1.

11. A polymer containing an antioxidant amount of the composition of claim 12.

12. A polymer containing an antioxidant amount of the composition of claim 10.

13. The composition of claim 1 wherein the phenolic antioxidant comprises a mixture of at least one aralkylene cresol and at least one alkylated cresol and the phosphite antioxidant comprises a mixture of tri(2-α-methylbenzylphenyl)phosphite and tri(4-α-methylbenzylphenyl) phosphite.

References Cited
UNITED STATES PATENTS

| | | | |
|---|---|---|---|
| 3,039,993 | 6/1962 | Freidman | 260—45.7 |
| 3,080,338 | 3/1963 | Nudenberg et al. | 260—45.7 |
| 3,112,286 | 11/1963 | Morris et al. | 260—45.95 |
| 3,244,661 | 4/1966 | Kline | 260—45.7 |
| 3,367,996 | 2/1968 | Strauss et al. | 260—45.95 |

FOREIGN PATENTS 206,712   2/1956   Australia.

HOSEA E. TAYLOR, Primary Examiner

U.S. Cl. X.R.

252—400; 260—45.7

PO-1050
(5/69)

UNITED STATES PATENT OFFICE
CERTIFICATE OF CORRECTION

Patent No. 3,535,277      Dated October 20, 1970

Inventor(s) Donald E. Miller and Ralph G. Fleming

It is certified that error appears in the above-identified patent and that said Letters Patent are hereby corrected as shown below:

Column 2, line 24, "cresole" should read -- cresols --;
          line 34, "teriary" should read -- tertiary --.

Column 7, line 62, "2.20" should read -- 2.25 --.

Column 8, line 24, after "tests" insert -- were --;
          line 35, "$\frac{\phantom{R_d}}{\overline{/a/} + \overline{/b/}}$" should read -- $\frac{R_d}{\overline{/a/} + \overline{/b/}}$ --;

lines 50 and 51, delete "13, a compound identified as tris benzyl phosphite" and insert -- 12, benzylated phenol --.

Column 5, Oxygen Absorption Test table, under "Phenolic stabilizer opposite Example 12, "sturenated" should read -- styrenated --;

under "Phosphite stabilizer" opposite Example 16, before "toluene" insert -- vinyl --.

Figures 1, 2, 3 and 4, before "Percent Oxygen Absorption" insert -- Time To A Given --.

Signed and sealed this 13th day of April 1971.

(SEAL)
Attest:

EDWARD M. FLETCHER, JR.
Attesting Officer

WILLIAM E. SCHUYLER, JR.
Commissioner of Patents